Sept. 1, 1964  R. A. ALEXANDER ETAL  3,147,054
TEST POINT EXTENDER FOR CIRCUIT BOARDS
Filed June 14, 1962  3 Sheets-Sheet 1

INVENTORS
REGINALD A. ALEXANDER
& HERBERT H. OLSON
BY
ATTORNEY

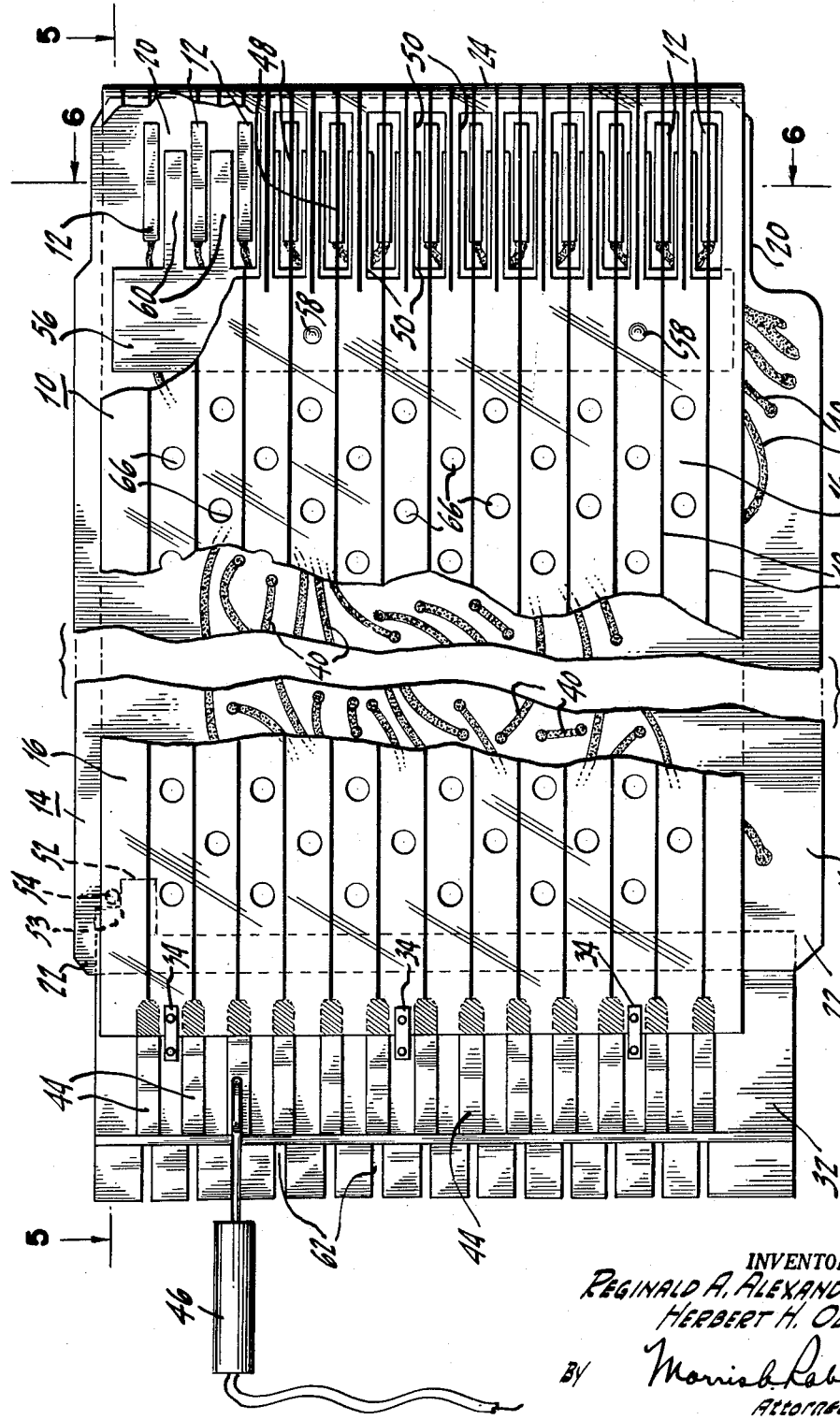

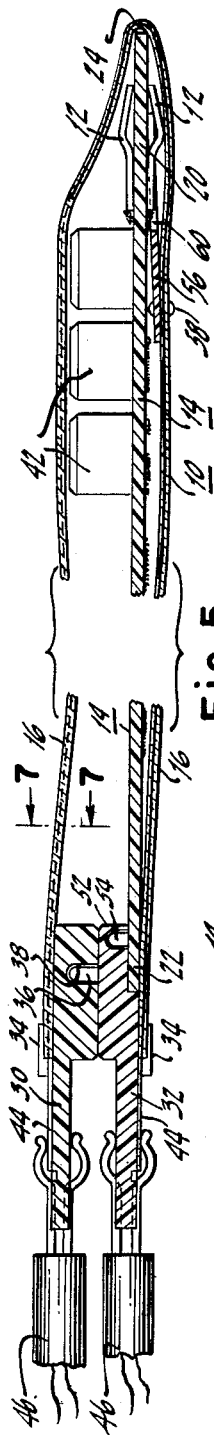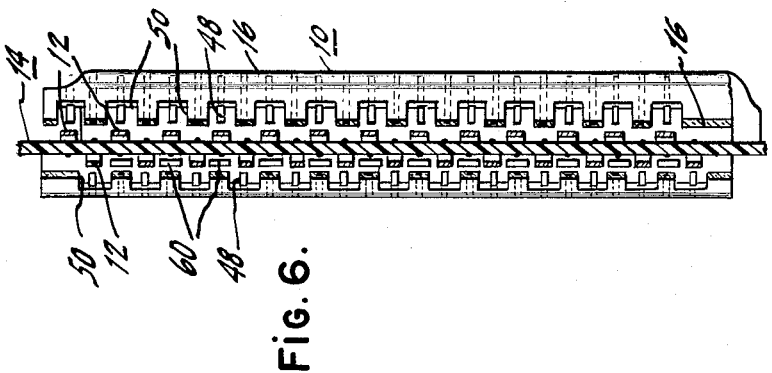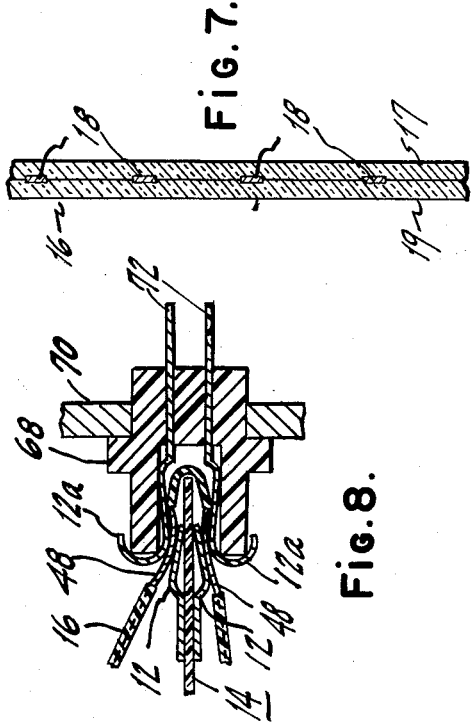

United States Patent Office 3,147,054
Patented Sept. 1, 1964

3,147,054
TEST POINT EXTENDER FOR CIRCUIT BOARDS
Reginald A. Alexander, Medford, N.J., and Herbert H. Olson, Glenolden, Pa., assignors to Radio Corporation of America, a corporation of Delaware
Filed June 14, 1962, Ser. No. 202,562
7 Claims. (Cl. 339—17)

This invention relates generally to the art of electrical testing apparatus, and particularly to a contact point extender, for example, for extending test points on electrical apparatus from a relatively inaccessible area to a location more suitable for testing. The contact extender of the present invention is particularly useful for extending test points on a modular, plug-in circuit board while the latter is plugged in to an electrical system for normal operation, without adversely affecting the operation of the circuitry.

Many large, relatively complex, electronic systems comprise a number of cabinets, each containing a large number of modular, plug-in circuit boards that employ a number of components in compact circuit arrangements. Each modular, plug-in circuit board may have a number of electrical contacts adjacent to one of its edges, forming a plug therewith, so that the circuit board can be plugged into a mating electrical receptacle in the cabinet to provide both input and output connections for the circuits on the circuit board. A number of circuit boards are usually plugged into each of the cabinets in a crowded arrangement, and cooling means are usually provided to dissipate the heat generated by the electrical circuits. The electrical connections in the rear of the cabinets are usually so numerous and so closely packed that it is difficult and confusing to test or to monitor the circuits on a plug-in circuit board by probing the connections in the rear of the cabinet into which the circuit board is plugged. Also, it is sometimes necessary to employ two technicians, one on each side of the cabinet, to identify electrical connections properly for testing the circuits on the circuit boards. Aside from the difficulty of identifying the proper contacts or terminals for testing, it is difficult to prevent inadvertent short circuits when testing closely packed components with a test probe.

It is an object of the present invention to provide novel apparatus for extending, to a more accessible location for testing or monitoring, or the like purposes, and for readily identifying at such accessible location, test points or contacts adjacent to the relatively inaccessible, plug-in edge of a plug-in circuit board.

Another object of the present invention is to provide a novel test point extender for facilitating the testing or monitoring of circuitry on a plug-in circuit board while the circuit board is plugged into an electrical system and its circuits are in an operating condition.

A further object of the present invention is to provide a novel, re-usable test point extender that is relatively simple in construction, economical of space, and highly efficient in use in compact and complex electrical systems employing modular, plug-in circuit boards.

In accordance with the present invention, the novel test point or contact extender comprises a sheet of insulating material adapted to be wrapped around a modular, plug-in circuit board, or the like. A number of electrical conductors are supported by the sheet, and portions of each conductor adjacent to its opposite ends are bare of any insulation. Each conductor has one of its bare ends disposed adjacent to a different one of a plurality of normally inaccessible test points on the circuit board, so that each conductor makes an electrical contact with a separate test point when the circuit board is plugged into a mating socket or receptacle for normal operation of the circuits on the circuit board. The other bare end of each conductor, remote from the inaccessible test point to which it is electrically connected, is located in a suitable readily accessible location for testing purposes. The test point extender may include indexing means for positioning it accurately with respect to the test points on the plug-in circuit board. The test point extender may also bear suitable indicia for identifying the test points that are extended to the accessible testing location.

The novel features of the present invention, both as to its organization and method of operation, as well as additional objects and advantages thereof, will be more readily understood from the following description, when read in connection with the accompanying drawings in which the same reference characters designate similar parts throughout, and in which:

FIG. 4 is an enlarged, side elevational view of the test point extender in engagement with the plug-in circuit board, with parts of the test point extender broken away to reveal portions of the plug-in circuit board;

FIG. 5 is a cross-sectional view, taken along the line 5—5 of FIG. 4, of the test point extender in engagement with the plug-in circuit board;

FIG. 6 is a cross-sectional view, taken along the line 6—6 of FIG. 4, of the test point extender in engagement with the plug-in circuit board;

FIG. 7 is an enlarged, fragmentary, cross-sectional view, taken along the line 7—7 of FIG. 5, of a portion of the flexible sheet of the test point extender, showing electrical conductors embedded therein; and FIG. 8 is a fragmentary, cross-sectional view of both the test point extender and the plug-in circuit board plugged into a mating receptacle.

Figure 3:
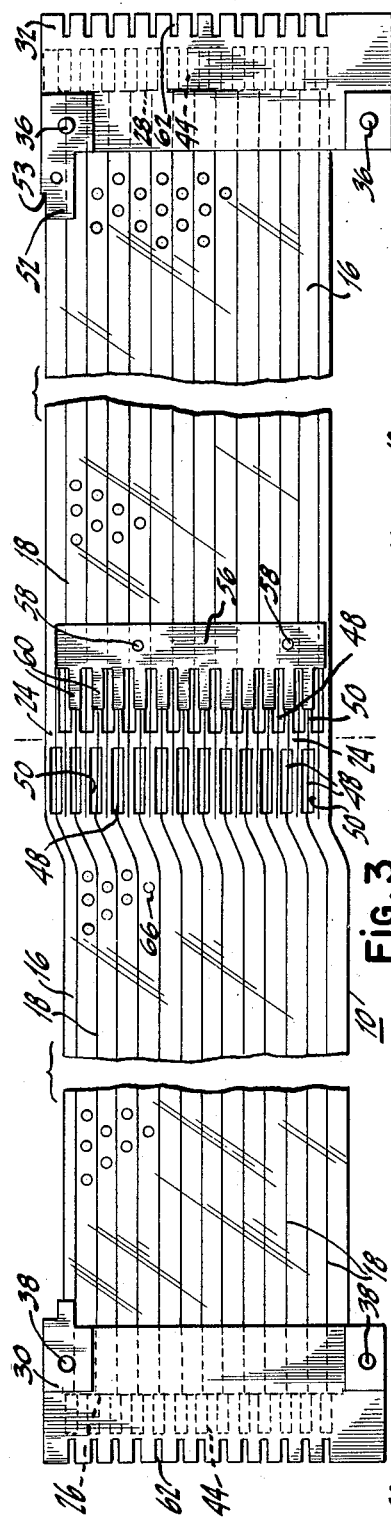
FIG. 3 is a plan view of the unfolded inside surface of the test point extender.
Figure 2:
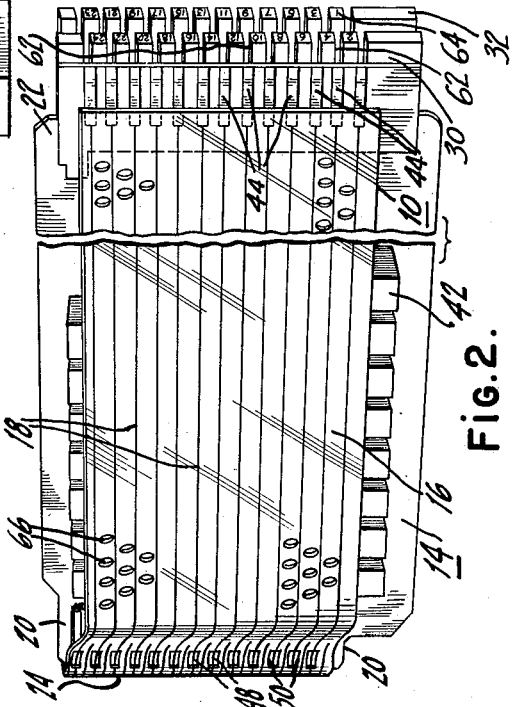
FIG. 2 is a perspective view of the test point extender in engagement with the plug-in circuit board, as viewed from the other side of the plug-in circuit board.

Referring, now, particularly to FIGS. 1 to 4 there is shown a test point extender 10 for extending contacts or test points 12 on a rigid, modular, plug-in circuit board 14. The test point extender 10 comprises a flexible, elongated sheet 16 of insulating material, such as polyvinyl chloride, Mylar, Kel-F, or the like. The sheet 16 may comprise two or more fused or bonded laminations 17 and 19 of insulating material that support a plurality of conductors 18 between them, as shown in FIG. 7. The conductors 18 are preferably of Phosphor bronze to provide a high degree of wearability, flexibility, and strength. The material of the conductors 18 can be bonded to one of the laminations 17 or 19 or separate conductors 18 can be formed by an etching process known in the art.

The conductors 18 are divided into two groups to extend test points on opposite sides, respectively, of the front portion 20 of the circuit board 14 to a location adjacent the rear portion 22 of the circuit board 14. To this end, the conductors 18 are arranged substantially parallel to each other or in any other, suitable pattern to obtain suitable electrical characteristics. Some conductors 18 extend from substantially the mid-portion 24 to one end 26 of the sheet 16, and the remainder of the conductors 18 extend from substantially the mid-portion 24 of the sheet 16 to the opposite end 28 thereof, the conductors 18 being separated at the mid-portion 24.

Figure 1:
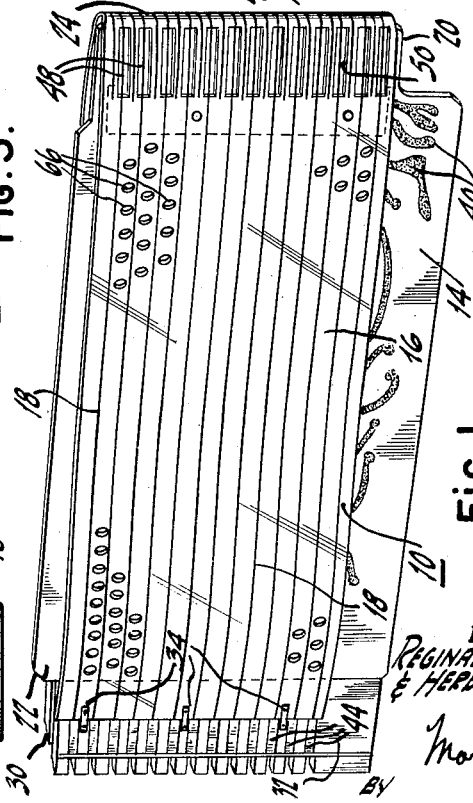
FIG. 1 is a perspective view of a test point extender in engagement with a plug-in circuit board in accordance with the present invention, as viewed from one side of the plug-in circuit board.

Means are provided to maintain the test point extender 10 snugly wrapped around the circuit board 14. Thus, a pair of interconnecting blocks or strips 30 and 32 are secured to the opposite ends 26 and 28, respectively, of the sheet 16 by any suitable means, such as by braces 34, as shown in FIGS. 1 and 4, for example. The strips 30 and 32 are provided with interlocking means to maintain the test point extender 10 snugly wrapped around the circuit board 14. For this purpose, the strip 32 is formed with a pair of pins 36 that are adapted to be received within a pair of mating holes 38 in the strip 30, as shown in FIG. 5. The strips 30 and 32 may be molded or fabricated from any suitable insulating material, such as a plastic material. It will now be understood that the test point extender 10 can be wrapped snugly around a circuit board 14 and held in this position by interlocking the strips 30 and 32, shown in FIG. 5.

Referring, now, particularly to FIGS. 4, 5, and 6, there are shown details of the circuit board 14. The test points 12, which may also be part of the etched circuitry, are disposed on opposite surfaces of the circuit board 14 and are raised above the latter surfaces. The test points 12 comprise parallelly disposed contacts that are arranged in two rows, one on each side of the circuit board, and in one row are staggered with respect to the test points 12 in the other row, as shown in FIG. 6. The test points 12 may comprise the input and output connections, as well as power and ground conections, for printed circuitry 40 on the circuit board 14. In the embodiment of the illustrated circuit board 14, electrical components 42 are connected to the printed circuitry 40 to form an electrical, modular, circuit board that is adapted to be plugged into a mating receptacle 68 of a complex electrical system, as shown in FIG. 8. It will be understood that, when the circuit board 14 is plugged into a receptacle of an electrical system, the test points 12 and corresponding contacts on the receptacle in the front of the board (so called for convenience) may be substantially inaccessible for the purpose of applying test probes to them to test or to monitor the operation of the circuitry 40 and components 42 on the circuit board.

The test points 12 adjacent the front portion 20 of the circuit board 14 are extended adjacent to the rear portion 22 of the circuit board 14 by the conductors 18. Portions of the conductors 18 adjacent the ends 26 and 28 of the sheet 16 are bare of insulation and form rear contacts 44 which may be secured to the strips 30 and 32 by any suitable means. The rear contacts 44 may also be wider than the conductors 18 to provide suitable electrical connections for one or more probes 46 adapted to be connected to selected rear contacts 44, as shown in FIGS. 4 and 5.

The conductors 18 adjacent the front portion 20 of the circuit board 14 are also bare of insulation, forming front contacts 48. Each of the front contacts 48 is disposed adjacent to a separate test point 12 of the circuit board 14 so that it makes an electrical contact therewith when the circuit board 14 and the test point extender wrapped around it are plugged into a mating socket or receptacle 68, as shown in FIG. 8. The sheet 16 is formed with a plurality of elongated openings 50 so as to expose the bare, front contacts 48 of the conductors 18. Thus, the front contacts 48 and the test points 12 can make electrical contacts with the respective contacts 12a of the mating receptacle 68 when plugged therein. The receptacle 68 is fixed to the wall 70 of a cabinet (not shown) of an electrical system.

Indexing means are provided to position the test point extender 10 accurately with respect to the rear portion 22 of the circuit board 14 when the former is wrapped snugly around the latter. To this end, at least one of the strips 30 and 32 is formed with a notch within which to hold an indexing member on the circuit board 14. Thus, the strip 32 has a projection 52 formed with a notch 53 therein for engaging the pin 54 on the circuit board 14, as shown in FIG. 4. Alternatively, the pin 54 may be fixed to one of the strips for engagement within a hole in the circuit board.

Additional indexing means are provided to position the test point extender 10 with respect to the test points 12. These indexing means are in the form of a comb 56 (see FIGS. 3–5) fixed to the sheet 16 adjacent to the central portion 24 thereof. The comb 56 is made of insulating material, such as stiff plastic material, and is fixed to the flexible sheet 16 by any suitable means, such as plastic rivets 58. The comb 56 is formed with regularly spaced teeth 60 that are disposed to project between the raised test points 12 on one side of the circuit board 14, as shown in FIGS. 4 and 6. When the test point extender 10 is snugly wrapped around the circuit board 14, with the indexing pin 54 in the notch 53, the teeth 60 of the comb 58 dispose the sheet 16 so that the bare, front contacts 48 of the conductors 18 are disposed adjacent to respective test points 12 and make electrical contacts with them when pressed against them, as when the circuit board 14 with the test point extender 10 thereon is plugged into the mating receptacle 68. In cases where the test points 12 are not raised, one or more raised members, such as one or more raised, dummy test points or pins, may be fixed to the circuit board to position the comb 56 accurately with respect to the test points 12.

The strips 30 and 32 are formed with a plurality of regularly spaced slots 62, each adjacent to a separate rear contact 44 of the conductor 18. The slots 62 form convenient means for positioning accurately the probe 46 when the latter is to make contact with a designated rear contact 44. Indicia, such as numbers 64, are placed on the rear portions of the strips 30 and 32, between the slots 62 therein, to identify the particular conductor 18 that is connected to the respective test point 12 to be extended to the location where the rear contact 44 is disposed.

In operation, to test or to monitor the input and the output points to the circuitry 40 on the circuit board 14 under operating conditions, the test point extender is wrapped snugly and accurately around the circuit board 14. The indexing pin 54 is disposed in the notch 53 of the block 32, and the teeth 60 of the comb 58 are disposed between the raised test points 12 on one side of the circuit board 14. The circuit board 14 and the test point extender 10 are plugged into the mating receptacle 68 so that each of the bare, front contacts 48 of the conductors 18 is pressed between a pair of oppositely disposed test points 12 and contacts 12a, making good electrical contacts with them, as shown in FIG. 8. The inaccessible test points 12 or corresponding contacts 12a on the mating receptacle 68 may now be tested electrically by connecting one or more of the probes 46 from a suitable testing instrument (not shown) to an appropriate rear contact 44, as shown in FIG. 5. The contacts 72 (FIG. 8) are extensions of the contacts 12a, and provide means for electrically connecting the circuit board 14 into an electrical system. The indicia 64 on the rear portions of the strips 30 and 32 identify the respective test points to be tested. Since heat is generated during the operation of the circuitry 40 and components 42, the sheet 16 is formed with a plurality of openings 66 to dissipate this heat and to provide passageways for cool air from a blower, if present.

From the foregoing description, it will be apparent that there has been provided an improved contact extender that may be re-used a number of times for extending relatively inaccessible electrical contacts on a circuit board or the like to a location where testing is more suitable. While only one embodiment of the novel contact extender of the present invention has been described, various components useful therein, as well as variations in the apparatus itself, all coming within the spirit of this invention, will, no doubt, readily suggest themselves to those skilled in the art. Hence, it is desired that the foregoing shall be considered merely as illustrative and not in a limiting sense.

What is claimed is:
1. Apparatus for extending a plurality of contact points on a plug-in circuit board to easily accessible locations, said points being adjacent the plug-in edge of said board and raised therefrom, said apparatus comprising (a) a flexible sheet of insulating material adapted to be wrapped around said board, (b) interlocking means fixed to opposite ends of said sheet to maintain said sheet snugly wrapped around said board, (c) a plurality of electrical conductors fixed to said sheet, a first portion of each of said conductors being bare and being disposed adjacent a different one of said contact points to make an electrical connection therewith when pressed thereagainst, and a second portion of each of said conductors being bare and being disposed at a distance from said plug-in edge of said board, whereby electrical connections may be made easily to said second portions of said conductors, and (d) a comb of insulating material fixed to said sheet adjacent some of said first portions of said conductors, said comb having teeth that extend between some of said points to position said sheet when said sheet is wrapped around said board.

2. Apparatus for extending test points on a plug-in circuit board from a location adjacent to the plug-in portion of said circuit board to a location adjacent the rear portion of said circuit board, said apparatus comprising (a) a flexible sheet of insulating material adapted to be wrapped around said board, (b) interlocking means fixed to the ends of said sheet for maintaining said sheet snugly on said board, said interlocking means being adjacent to said rear portion of said circuit board when said sheet is wrapped around said board, (c) a plurality of conductors fixed to said sheet, said conductors extending from the mid-portion of said sheet to an end of said sheet, a portion of each of said conductors adjacent one end thereof being bare and being disposed to make an electrical contact with a different one of said test points when pressed thereagainst, and a portion of each of said conductors adjacent the other end thereof being bare and being disposed adjacent said interlocking means, whereby an electrical connection may be made easily to said other end of said conductor, and (d) indicia on said interlocking means for identifying said conductors.

3. A test point extender for use with a plug-in circuit board, said board having a plurality of test points adjacent the plug-in edge thereof, said test point extender comprising (a) a sheet of electrically insulating material, (b) a pair of rigid strips each fixed to the respective opposite ends of said sheet, (c) interlocking means on said strips to hold said sheet snugly against said board when said sheet is wrapped around said board, (d) indexing means on at least one of said strips to position said board accurately with respect to said sheet, and (e) a plurality of conductors fixed to said sheet, each of said conductors extending from one of said strips to a point approximately between said opposite ends of said sheet, a portion adjacent one end of each of said conductors being bare and being disposed adjacent a different one of said test points and adapted to make an electrical contact therewith when pressed thereagainst, and a portion adjacent the other end of each of said conductors being bare and being disposed adjacent to one of said strips.

4. A test point extender for use with a plug-in circuit board, said board having a plurality of test points adjacent the plug-in edge thereof, said test point extender comprising (a) an elongated sheet of electrically insulating material, (b) a pair of rigid strips each fixed to the respective opposite ends of said sheet, (c) interlocking means on said strips to hold said sheet wrapped around said board, (d) a plurality of conductors fixed to said sheet and extending from one of said strips to a point approximately between said opposite ends of said sheet, a portion adjacent one end of each of said conductors being bare and being disposed adjacent a different one of said test points and adapted to make an electrical contact therewith when pressed thereagainst, a portion adjacent the other end of each of said conductors being bare and being disposed adjacent one of said strips, (e) at least one of said strips bearing indicia to identify said conductors, and (f) means fixed to said sheet adjacent said one ends of said conductors to position said one ends accurately with respect to said test points, whereby to make electrical contacts with said test points.

5. A test point extender for use with a plug-in circuit board, said board having a plurality of test points adjacent the plug-in edge thereof, said test point extender comprising (a) an elongated sheet of electrically insulating material, (b) a pair of rigid strips each fixed to the respective opposite ends of said sheet, (c) said strips having means to maintain said sheet in a wrapped-around position on said board, (d) indexing means on at least one of said strips to position said board accurately with respect to said sheet, (e) a plurality of conductors fixed to said sheet, each of said conductors extending from one of said strips to a point at least half way between said opposite ends of said sheet, a portion adjacent one end of each of said conductors being bare and being disposed adjacent a different one of said test points, whereby to make an electrical contact therewith when pressed thereagainst, a portion adjacent the other end of each of said conductors being bare and being disposed adjacent one of said strips, (f) at least one of said strips bearing indicia to identify said conductors, and (g) means adjacent said one ends of said conductors to position said one ends accurately for making electrical contacts with said test points.

6. A test point extender for use with a plug-in circuit board, said board having a plurality of raised test points adjacent to the plug-in edge thereof, said test point extender comprising (a) an elongated sheet of electrically insulating material, (b) a pair of rigid strips each fixed to the respective opposite ends of said sheet, (c) interlocking means on said strips to hold said sheet snugly wrapped around said board, (d) indexing means on at least one of said strips to position said board accurately with respect to said sheet, (e) a plurality of conductors fixed to said sheet and extending from one of said strips to a point approximately between said opposite ends of said sheet, a portion of each of said conductors adjacent to one end thereof being bare and being disposed adjacent to a different one of said test points and adapted to make an electrical contact therewith when pressed thereagainst, a portion of each of said conductors adjacent to the other end thereof being bare and being disposed adjacent one of said strips, (f) at least one of said strips bearing indicia to identify said conductors, and (g) means fixed to said sheet adjacent said one ends of said conductors and extending between said raised test points to position said one ends accurately, whereby to make electrical contacts with said test points, said sheet being formed with a plurality of openings therein whereby to provide ventilation for said board.

7. A test point extender for use with a plug-in circuit board having a plurality of raised test points adjacent to the plug-in edge thereof, said test point extender comprising, in combination, (a) a laminated sheet of electrically insulating material, (b) a pair of rigid strips fixed to opposite ends, respectively, of said sheet, (c) interlocking means on said strips to hold said sheet wrapped around said board with the mid-portion of said sheet adjacent to said plug-in edge of said board, (d) a plurality of conductors fixed to said laminated sheet between laminations thereof and extending from one of said strips to approximately said mid-portion of said sheet, a portion of each of said conductors adjacent to one end thereof being bare and being disposed adjacent to a different one of said test points to make an electrical contact therewith when pressed thereagainst, a portion of each of said conductors adjacent to the other end thereof being bare and being disposed adjacent to one of said strips, (e) at least one of said strips bearing indicia to identify said conductors, and (f) positioning means fixed to said sheet adjacent to said one ends of said conductors to position said one ends accurately with respect to said test points, said positioning means comprising means extending between said raised points, said sheet being formed with a plurailty of openings therein whereby to provide ventilation for said board, and said strips being slotted to provide means for inserting removable probes for connections with said other ends of said conductors.

References Cited in the file of this patent
UNITED STATES PATENTS

| | | |
|---|---|---|
| 2,748,321 | Kamm | May 29, 1956 |
| 2,951,185 | Buck | Aug. 30, 1960 |
| 3,059,211 | Thomas et al. | Oct. 16, 1962 |
| 3,069,753 | Lalmond et al. | Dec. 25, 1962 |